United States Patent [19]

Cooper

[11] Patent Number: 4,486,024
[45] Date of Patent: Dec. 4, 1984

[54] DUAL-RING GLAND SEAL FOR DYNAMOELECTRIC MACHINE ROTOR

[75] Inventor: Glenn D. Cooper, North Huntingdon, Pa.

[73] Assignee: Westinghouse Electric Corp., Pittsburgh, Pa.

[21] Appl. No.: 495,551

[22] Filed: May 17, 1983

[51] Int. Cl.³ .......................... F16J 15/48; F16J 15/40
[52] U.S. Cl. .......................................... 277/3; 277/16; 277/27; 277/75; 277/174; 310/88
[58] Field of Search .................. 277/3, 27, 15, 16, 59, 277/71, 72 R, 72 FM, 74, 75, 76, 135, 174, 175; 310/88, 90

[56] References Cited

U.S. PATENT DOCUMENTS

| 1,453,083 | 4/1923 | Schuler . | |
| 2,971,783 | 2/1961 | Laser | 277/59 X |
| 3,143,676 | 8/1964 | Niemkiewicz | 310/88 X |
| 3,271,037 | 9/1966 | Hammond | 277/27 |
| 3,947,044 | 3/1976 | Friedrich | 277/3 |

FOREIGN PATENT DOCUMENTS

| 2304837 | 10/1976 | France | 277/3 |
| 865605 | 4/1961 | United Kingdom | 310/88 |
| 2055994 | 3/1981 | United Kingdom | 277/16 |

OTHER PUBLICATIONS

Ross & Sterrett, Hydrogen Cooled Turbine Generators, vol. 59, AIEE. Trans., pp. 11-17, (1940).
Snell, Hydrogen Cooled Turbine Generator, vol. 59, AIEE Transactions, pp. 35-50, (1940).
Rice, Liquid Film Seal for Hydrogen Cooled Machines, GE Review, vol. 30, pp. 516-530, (1927).
Snell & Grobel, Continuous Scavenging System for H₂ Cooled Generators, AIEE Transactions, vol. 69, pp. 1625-1636, (1950).
Baudry & Curtis, Gland Seal Systems for Modern H₂ Cooled Generator, AIEE, pp. 1-10, (1957).

Primary Examiner—Robert S. Ward
Attorney, Agent, or Firm—William D. Lanyi

[57] ABSTRACT

A gland seal assembly is provided which utilizes a double oil flow in conjunction with two gland seal rings. One of the oil streams is passed through a gland seal ring in a radial direction into the clearance gap between that ring and a rotatable shaft. Another flow of oil is passed between that ring and another gland seal ring in such a way as to exert a force between the rings which pushes the two rings in opposing axial directions away from each other and toward axial faces of an angular groove in a gland seal bracket. By causing a force against the gland seal rings in axial opposing directions, the rings are moved towards the axial faces of an annular groove in such a way that gaps between the gland seal rings and the groove wall are reduced with a corresponding reduction in the non-functional flow of oil.

20 Claims, 5 Drawing Figures

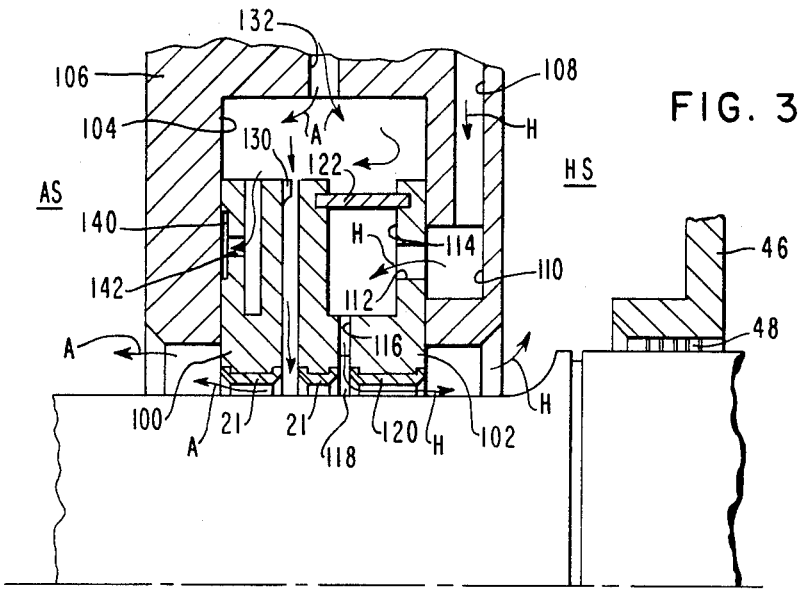
FIG. 3
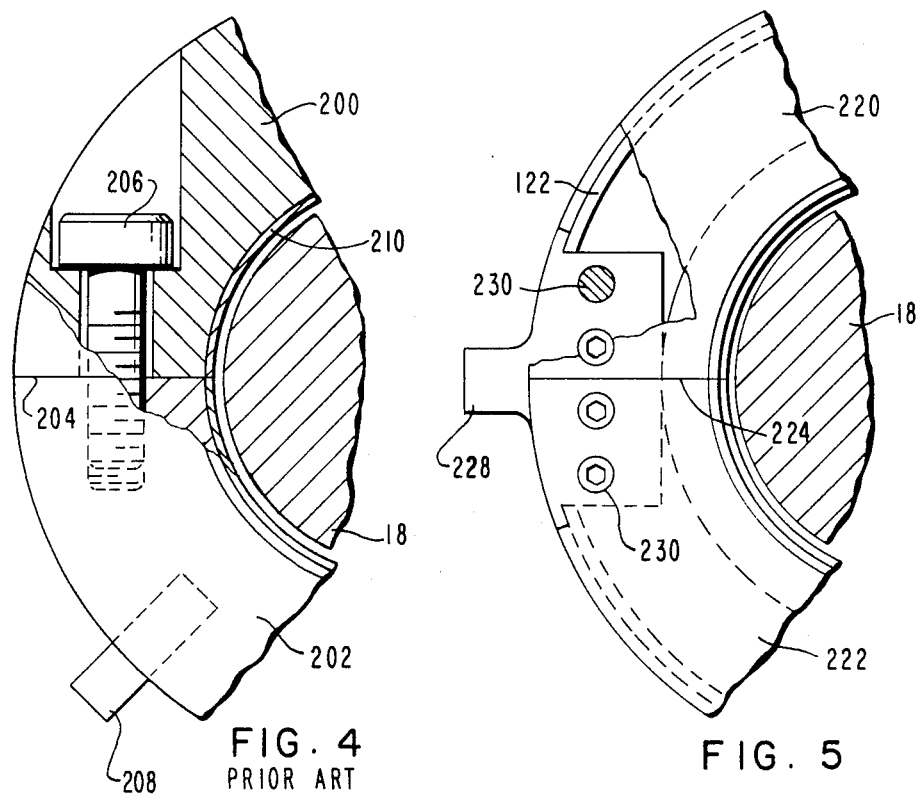
FIG. 4 PRIOR ART
FIG. 5

DUAL-RING GLAND SEAL FOR DYNAMOELECTRIC MACHINE ROTOR

BACKGROUND AND SUMMARY OF THE INVENTION

The present invention relates generally to gas seals which surround rotating shafts and, more particularly, to gland seals which utilize a thin film of oil which is maintained between the rotating shaft and two floating rings.

During the past 60 years, the development of hydrogen-cooled dynamoelectric machines has advanced significantly. Since the issuance of U.S. Pat. No. 1,453,083 to Schuler on Apr. 24, 1923, progress in hydrogen cooling of electrical generators has occurred steadily, along with suitable sealing devices which prevent the escape of hydrogen gas along the rotating shafts of the machine at the locations where the shaft extends axially from the gas-tight stator housing. The sealing of this interface between the stationary and rotating components of a dynamoelectric machine is generally accomplished by the use of a gland seal.

A hydrogen-cooled dynamoelectric machine requires shaft gland seals at each end of the generator's rotor in order that the hydrogen gas be prevented from escaping from the generator housing and also in order that air is not permitted to enter the generator housing. Gland seal assemblies generally comprise a bracket member and one or more sealing rings which are fitted close to the shaft's circumference and are free to move with the shaft in a radial direction. Generally, these rings are also permitted a slight axial movement along the shaft surface, but are retained so that they cannot rotate around the shaft. Sealing oil is provided at the interface between the shaft and rings in order to prevent the disadvantageous passage of gas through this gap. In typical gland seal designs, oil is pumped in a radially inward direction through the ring assembly and toward the rotor surface. After contacting the rotating surface of the rotor, the oil then travels in opposing axial directions and produces a thin oil film between the shaft and the gland seal rings.

The oil must be provided at a pressure which exceeds both the hydrogen pressure within the generator and the atmospheric pressure of the air at the axially outboard region of the gland seal assembly. The oil leaving both the air and hydrogen sides of the gland seal assembly is then collected and returned to a gland seal oil reservoir. It is generally necessary to remove gas and moisture from the gland seal oil supply by a vacuum treating process in order to prevent the oil which is leaving the hydrogen side of the shaft gland seals from liberating this gas and moisture inside the generator housing and thus reducing its hydrogen purity. Gland seal oil systems have been described at great length in the technical literature. For example, the early development of gland seals is discussed in "Hydrogen Cooled Turbine Generators" by M. D. Ross and C. C. Sterrett, volume 59, AIEE Transactions, Jan., 1940, pps. 11–17. Another discussion of the sealing of hydrogen cooled generators can be found in "The Hydrogen Cooled Turbine Generator" by D. S. Snell, Volume 59, AIEE Transactions, Jan. 1940, pps. 35–50. The dynamics of oil seal systems has been analyzed in "Liquid Film Seal for Hydrogen Cooled Machines" by C. W. Rice, General Electric Review, Volume 30, No. 11, Nov. 1927, pps. 516–530. An oil purification system used in conjunction with gland seals is described in "Continuous Scavenging System for Hydrogen Cooled Generators" by D. S. Snell and L. P. Grobel, AIEE Transactions, volume 69, 1950, pps. 1625–1636.

As discussed in the above cited references, hydrogen is typically sealed in generators at each end of its rotating shaft by means of a continuous film of oil maintained between the shaft and one or more floating rings. Two rings are generally used on smaller generators with lower gas pressures, and oil is introduced between the two rings at a pressure which is higher than the contained hydrogen gas pressure. The oil then passes between the shaft and the seal rings in both axial directions. The oil which flows towards the generator is then contained in a defoaming tank and eventually drained back to the sealed oil system where a vacuum treating system removes entrained hydrogen which has been absorbed by that oil. When high hydrogen pressures are used, the loss of hydrogen can be excessive and expensive. This hydrogen loss is a function of the quantity of oil flowing toward the hydrogen side of the seal. In order to minimize this hydrogen loss on larger generators, double oil flow systems were developed in the 1950's. Double flow oil systems use two separate oil flows. One oil flow is directed toward the air side of the seal and the other is directed toward the hydrogen, or generator, side with a small buffer zone in between. These two oil systems are designed so that their pressures can be generally equalized, thus minimizing both the introduction of entrained air into the hydrogen and the loss of hydrogen by entrainment in the oil. A detailed description of simple flow and double flow gland seal systems is contained in "Gland Seal Systems for Modern Hydrogen Cooled Turbine Generators", By R. A. Baudry and L. T. Curtis, which was presented at the AIEE Winter General Meeting, N.Y., Jan. 21–25, 1957, pps. 1–10.

A double flow system which is presently used on generators with gas pressures of 45 psig or more utilizes a single ring which has two oil feed grooves, one for air side oil and the other for hydrogen side oil. This ring is contained in an annular groove of a gland seal bracket and is free to move with the shaft in a radial direction by virtue of an axial clearance between the ring and the annular groove. This freedom of movement is important because a ring which is bound within the bracket can cause rubbing between itself and the shaft and, thus, induce unstable shaft vibrations. In order to maintain this freedom of movement, not only does the ring require a slight axial clearance within the annular groove, but the frictional forces between the ring and the groove must be minimized. This frictional force is partly a function of the axial pressures acting on the ring and pushing it against the air, or outboard, side of the annular grooove. Normally, air side oil is also introduced into a float oil groove and the net unbalanced axial force is thus minimized to a sufficient degree.

Significant problems are experienced in conjunction with presently known gland seal designs. Excessive oil can be introduced into the generator either by intermittent oil spills or on a regular continuing basis. The normally expected oil flow toward the hydrogen side of the seal ring at any given differential seal oil pressure has been found to be of prime importance in the generator's oil usage. This oil flow creates vapor in proportion to its quantity and must be drained in order to avoid spills within the generator housing. Therefore, it is significantly advantageous to reduce this oil flow.

In present designs, it has sometimes been found that more than half of the flow of oil to the hydrogen side passes in a radially inward direction between an axial face of the gland seal ring and its proximate axial surface of the annular groove of the gland seal bracket. The clearance between the gland seal ring and the bracket is generally held to a nominal 0.007 inches to permit the radial movement of the gland seal ring as described above. This escaping oil, which does not beneficially aid the primary function of the gland seal system, travels a radial distance of approximately 0.37 inches from a hydrogen side oil feed groove to the hydrogen gas atmosphere within the generator frame. The significance of this oil loss can be realized by comparing this oil path to the axial clearance between the ring and the shaft which is only about 0.0025 to 0.0035 inches over a length which is approximately 0.625 inches long in the axial direction. Since any oil flow through this type of clearance is proportional to the cube of the clearance and inversely proportional to the length of passage and the oil viscosity, it can be calculated that this non-functional radial flow exceeds the functional axial flow and can constitute over half the total flow into the generator under these conditions.

Another significant problem encountered is shaft vibrations which are caused by a rubbing between the shaft and the gland seal rings. Occasionally these vibrations require disassembly of the bearing and gland seal brackets in order to determine their precise cause. One possible cause of this rubbing is the fact that the ring is not free to move within its annular groove due to the loss of the axial clearance described above. This axial clearance can be lost due to either bracket or ring distortion, the ring being out-of-round or the ring being assembled in a non-perpendicular association with the shaft. The problem of rubbing between the ring and the shaft is related to the above-described problem of oil usage in that, if a larger axial clearance is used between the ring and its bracket to prevent binding the ring, even more oil will flow into the generator.

Since gland seal rings are typically made from two ring halves which are butt-jointed and bolted together, variations in bolt tension can produce significant variations in ring roundness. Since, in single ring gland seal systems the ring is approximately 1.75 inches wide in the axial direction, it is very important that the ring be perpendicular to the shaft center line in order to minimize possible susceptibility to rubbing. When the gland seal ring is not perpendicular to the shaft center line, there is not only a greater possibility of rubbing between the gland seal ring and the shaft, but also a pumping action in the oil film that can increase oil flow into the generator.

It is an object of the present invention to provide a gland seal assembly which permits adequate radial movement of the gland seal ring while minimizing excessive oil usage which is caused by the passage of gland seal oil in a radially inward direction between the bracket and ring. Another object of the present invention is to permit the use of air side oil to cool the gland seal rings. A further object of the present invention is to minimize the importance of close machining tolerances of the annular groove of the gland seal bracket and to permit the gland seal rings to be assembled without significant risk of distortion. The present invention provides a gland seal assembly which utilizes a double oil flow and two gland seal rings. Each of the gland seal rings has an inner cylindrical surface and the two rings are assembled with their inner cylindrical surfaces being coaxial. Both rings are disposed in an annular groove of a gland seal bracket. The gland seal assembly of the present invention provides an oil flow between the first and second rings in a radially inward direction toward the shaft surface. The second gland seal ring is provided with a conduit which allows fluid communication between a passage through the bracket and the oil film which is located between the shaft and the second gland seal ring.

The inner cylindrical surface of the second gland seal ring is provided with an opening through it. This opening is in fluid communication with the conduit which permits oil passage through the second ring. Therefore, a flow of oil is permitted to pass from an external source through the gland seal bracket, through the second gland seal ring and into the clearance gap which exists between the second gland seal ring and the rotor. This oil flow is maintained separately from another oil flow which travels from an external source, into the annular groove of the bracket, between the first and second gland seal rings and into the clearance gap which exists between the first gland seal ring and the shaft. The first oil flow travels axially inward along the rotor shaft and towards the hydrogen atmosphere within the generator frame. The second oil flow travels at an axially outward direction along the rotor shaft and toward the air at atmospheric pressure. The passage of the second oil flow between the first and second gland seal rings causes the two rings to move away from each other in opposing axial directions. This movement causes each of the rings to contact opposing axial sides of the annular groove of the gland seal bracket and thus minimize oil passage between each of the gland seal rings and its most proximate axial surface of this annular groove.

The first gland seal ring can also be provided with an additional groove on its axial surface which is most proximate an axially outward surface of the annular groove of the gland seal bracket. The function of this groove is to permit the air side oil of the second oil flow to exert a slight axial force between the gland seal bracket and the first ring. This force is exerted against the first gland seal ring in an axially inward direction and acts to counterbalance other axial forces in the opposite direction. The purpose of this counterbalancing is to prevent binding between the first gland seal ring and the outward axial surface of the annular groove of the bracket.

The present invention also provides for the second oil flow to pass over the radially outward surfaces of the second gland seal ring. The purpose of this passage is to provide additional cooling of the second gland seal ring. The second oil flow passes over these surfaces of the second gland seal ring prior to its passage between the first and second gland seal rings in a radially inward direction towards the shaft.

Since the first and second oil flows are kept at essentially identical pressures, the rate of the first oil flow will be significantly less than the second because the hydrogen gas within the generator frame is at a significantly higher pressure than the air towards which the second oil flow passes. Therefore, the second flow of oil experiences a significantly higher pressure differential which causes a higher rate of flow. The cooling capability of this higher rate of flow of the second oil flow is taken advantage of by passing it over the second gland seal ring prior to its entry into the clearance gap between the first gland seal ring and the shaft.

Since gland seal rings are usually manufactured in two halves and bolted together during assembly, the present invention incorporates a lap-type joint between these two halves in contrast with the butt-type joint used in present single ring designs. The importance of this joining technique is that, during assembly of the two halves, the former method exerts a tangential force on the ring halves. If the joined surfaces of these two ring halves are not perfectly aligned, this tangential force will tend to distort the ring in order to align these mating surfaces. In the present invention, the lap-type joint requires only axial forces and, therefore, will not distort the gland seal ring even if the mating surfaces of its two halves are misaligned.

BRIEF DESCRIPTION OF THE DRAWING

The invention will be more fully understood from the following detailed description of the preferred embodiment, read in conjunction with the accompanying drawing, in which:

FIG. 3 illustrates the present invention;

FIG. 4 illustrates a butt-type connection between the two halves of a gland seal ring; and FIG. 5 illustrates the lap joint between the two mating surfaces of a gland seal ring made in accordance with the present invention.

DESCRIPTION OF THE PREFERRED EMBODIMENT

The present invention relates to a gland seal assembly and, more particularly, to a gland seal assembly which utilizes two gland seal rings and also provides for two independent oil flows therethrough. The present invention incorporates a double flow gland seal comprising two gland seal rings. A first ring is disposed on the air side of the gland seal assembly and a second ring is disposed on the hydrogen side of the gland seal assembly.

Figure 1:
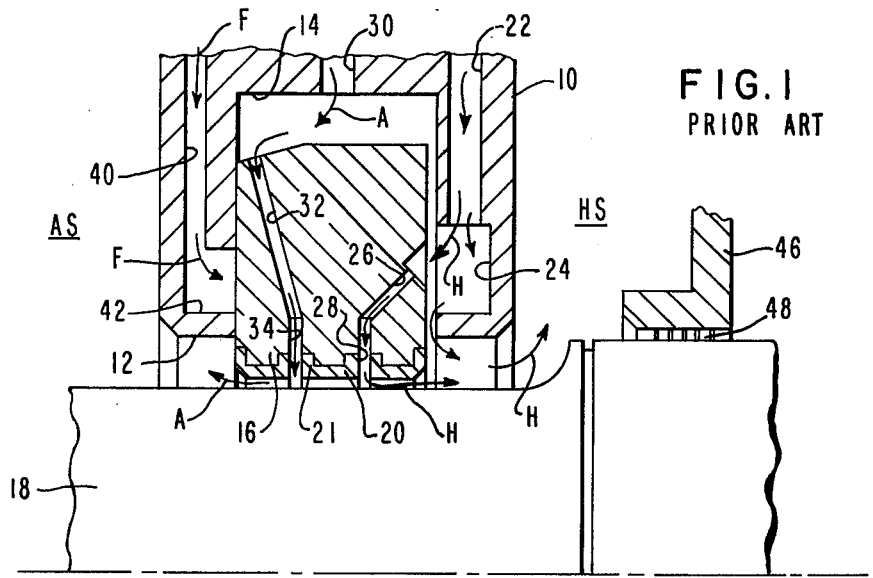
FIG. 1 illustrates a gland seal assembly which utilizes a single gland seal ring and provides a double oil flow.

Various types of gland seal structures have been used in the past. They all are intended to perform the basic function of providing a thin film of oil between a rotating shaft and one or more gland seal rings. In FIG. 1, a gland seal assembly is illustrated which incorporates a double oil flow in conjunction with a single gland seal ring. This type of gland seal assembly incorporates a bracket 10 which is generally cylindrical in shape and has a cylindrical inner surface 12. An annular groove 14 is provided in the inner cylindrical surface 12. The annular groove 14 is shaped to receive a gland seal ring 16 in sliding association. The ring 16 is disposed around a rotatable shaft 18 with an inner cylindrical surface 20 of the gland seal ring 16 being generally coaxial with the shaft 18. As shown in FIG. 1, a small clearance gap exists between the gland seal ring 16 and the shaft 18.

Gland seal brackets of the type illustrated in FIG. 1 provide a double oil flow. A first oil flow passes from an external source through the bracket 10 by way of a fluid conducting means 22. This conducting means 22 can comprise one or more holes along with an annular groove 24 which is formed within an axial surface of the annular groove 14. The gland seal ring 16 is provided with a fluid conducting means 26 which permits this first oil flow to pass from the annular groove 24 into an opening 28 in the inner surface 20 of the gland seal ring 16. As shown in FIG. 1, the combination of these fluid conducting means permits a supply of hydrogen side oil to pass from an external source, through the gland seal ring 16 and into the clearance gap which exists between the inner cylindrical surface 20 of the gland seal 16 and the shaft 18. This passage of hydrogen side oil is illustrated by arrows H.

A second flow of oil is provided by the fluid conducting means 30 which permits oil to flow, from an external source, into the annular groove 14. This oil passes into a portion of the annular groove 14 which is located radially outward from the gland seal ring 16 and then through a hole 32 which is in fluid communication with a groove 34. The groove 34 is an opening in the inner cylinder surface 20 of the gland seal ring 16 and, in association with the other components of this oil passage, provides fluid communication between an external source and the clearance gap between the inner cylindrical surface 20 of the gland seal ring 16 and the shaft 18. This air side oil travels along the path which is indicated, in FIG. 1, by arrows A.

As can also be seen in FIG. 1, this type of gland seal assembly can also be provided with a float oil system which comprises a hole 40 arranged in fluid communication with an annular groove 42 in an axial surface of the annular groove 14. A flow of oil passes from an external source through the hole 40 and the annular groove 42 and exerts an axial force against the gland seal ring 16. Typically, this oil flow can be provided from the same source which provides the air side oil flow discussed above. The float oil travels along the passage in the directions marked by arrows F. It should be understood that the provision of an oil float supply is optional and is not required on all alternative embodiments of the gland seal structure illustrated in FIG. 1.

As illustrated in FIG. 1 by arrows H, the hydrogen side oil passes axially inward through the clearance gap and enters the hydrogen atmosphere within the generator frame. Similarly, the air side oil, illustrated by arrows A, enters the clearance gap and passes axially outward towards the atmosphere. The combination of these two axially opposing flows within the clearance gap prevents hydrogen gas from passing in an axially outward direction from the generator and also prevents air from passing in an axially inward direction into the generator frame.

The purpose of the float oil system described above is to prevent the combination of the pressurized hydrogen and hydrogen side oil from forcing the gland seal 16 axially outward against a surface of the annular groove 14 with sufficient force to bind it and prevent radial movement. The float side oil pressure exerts a partially compensating axially inward force against the gland seal 16 and counteracts any tendency that the gland seal 16 would otherwise have to bind against the axially outward surface of the annular groove 14.

In order to permit the gland seal 16 to have a freedom of motion in the radial direction, an axial clearance must be provided between the gland seal ring 16 and the annular groove 14. As illustrated in FIG. 1, this clearance can permit hydrogen side oil to pass in a radially inward direction between the gland seal ring 16 and the bracket 10. This non-functional passage of oil is shown passing through a small gap which exists between the bracket 10 and the axially inward surface of the gland seal 16 which permits oil to flow directly from the annular groove 24 into the hydrogen atmosphere of the generator. Since this oil flow does not pass through the clearance groove between the gland seal ring 16 and the rotor 18, it is non-functional in helping to prevent the passage of gas through this clearance gap. However, since all oil which enters the hydrogen atmosphere entrains hydrogen gas and therefore must be removed, this nonfunctional oil flow is significantly disadvantageous.

The hydrogen side oil, after passing through the clearance gap or directly from the annular groove 24, then enters a containment which holds the oil until it can be defoamed and the entrained hydrogen gas can be removed from it. The passage of this oil, as indicated by the arrows H, proceeds axially inward between the bracket 10 and another bracket member 46 which provides a plenum seal 48 between itself and the shaft 18. The purpose of this plenum seal 48 is to prevent a massive flow of oil, in either liquid or vapor form, from entering the main body of the generator which is located axially inboard from the plenum seal 48.

Figure 2:
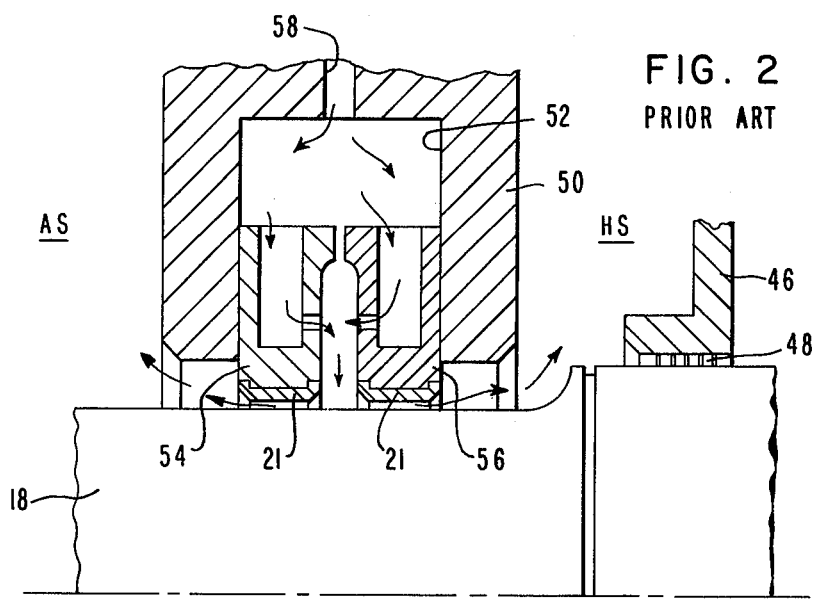
FIG. 2 illustrates a gland seal assembly which utilizes a single oil flow and two gland seal rings.

As illustrated in FIG. 2, some gland seal assemblies incorporate two rings in conjunction with a single oil flow. A bracket 50 is provided with an annular groove 52 which is shaped to receive two gland seal rings, 54 and 56, in sliding relation. The bracket 50 is provided with a means 58 for conducting an oil flow into the annular groove 52 and between the two gland seal rings, 54 and 56. A flow of oil, as illustrated by the arrows in FIG. 2, passes into the annular groove 52 and between the two gland seal rings, 54 and 56, before entering a clearance gap between the rings and a rotor 18. It should be understood that, due to the fact that the hydrogen within the generator frame is at a significantly higher pressure than atmospheric air, a much higher quantity of oil flows through the gap between the first gland seal ring 54 and the rotor 18, than through the gap between the second gland seal ring 56 and the rotor 18. As described above, the oil that flows axially inward into the hydrogen atmosphere is collected in a containment tank and is defoamed. At this time, the seal oil system also removes hydrogen gas which is entrained within the oil supply.

FIG. 3 illustrates a gland seal assembly made in accordance with the present invention. The present invention utilizes a double oil flow along with two gland seal rings. A first ring 100 and a second ring 102 are shaped to be received in an annular groove 104 which is formed in a bracket 106. The annular groove 104 and the first 100 and second 102 gland seal rings are shaped in such a way that the two gland seal rings are free to move in a radial direction within the annular groove 104. The gland seal bracket 106 is provided with a means for introducing a flow of oil into the annular groove 104. This first flow of oil passes through a hole 108 and into an annular groove 110 which is formed in one wall of the annular groove 104. The second gland seal ring 102 is provided with a conduit through it which permits a flow of oil to pass from the annular groove 110 into the clearance gap which exists between the second gland seal ring 102 and the rotor 18. This conduit is shown in FIG. 3 as consisting of at least one axial hole 112 passing through a portion of the second gland seal ring 102 and into an annular groove 114 which is formed in the radially outer surface of the second gland seal ring 102. At least one other hole 116 extends in a radial direction from this annular groove 114 into an opening 118 in the inner cylindrical surface 120 of the second gland seal ring 102. As can be seen in FIG. 3, a flow of oil can thus pass from an external source, through the hole 108, and successively through the annular groove 110, the axial hole 112, the annular groove 114, the radial hole 116 and into the opening 118 prior to its passage into the clearance gap which exists between the second gland seal ring 102 and the rotatable shaft 18. The annular groove 114 is provided with a barrier 122 which prevents fluid communication between the annular groove 114 and the radially outward portion of the annular groove 104. The flow of oil through the passage described above is illustrated in FIG. 3 by the series of arrows H. This hydrogen side oil flow passes in an axially inward direction through the clearance gap and into the generator frame prior to its being subsequently evacuated and defoamed.

The first gland seal ring 100 is disposed, as shown in FIG. 3, axially outward from the second gland seal ring 102. The first gland seal ring 100 is provided with a means for spacing it apart from the second gland seal ring 102. In FIG. 3, this spacing means is shown as a boss portion 130 on the inward axial face of the first gland seal ring 100. This boss 130 is provided with a plurality of radial passages therethrough so that a second flow of oil can pass between the first 100 and second 102 gland seal rings. The bracket 106 is provided with a means for permitting a flow of oil from an external source into the annular groove 104. In FIG. 3, the oil flows through a hole 132 into the annular groove 104 prior to passing radially inward between the first 100 and second 102 gland seal rings. After passing between the two gland seal rings, this second flow of oil passes through the clearance gap between the first gland seal ring 100 and the rotor 18 and then exits in an axially outward direction toward the air which is at atmospheric pressure.

The function of the barrier 122 is to prevent mixing of the hydrogen side oil, as it passes along the path indicated by the arrows H, and the air side oil, as it passes along the path indicated by the arrows A. As can be seen in FIG. 3, the air side oil is permitted to pass over the radially outer surfaces of the second gland seal ring 102 prior to its passing between the first 100 and second 102 gland seal rings. This flow of air side oil over the second gland seal ring 102 has the beneficial effect of removing heat from it. Since the hydrogen side and air side oil flows are maintained at generally equal pressures, it should be apparent that the rate of air side oil flow is significantly greater than that of the hydrogen side oil flow. The reason for this difference in flow rate is that the hydrogen gas within the generator frame is maintained at a pressure which is higher than the air which is at atmospheric pressure. Since both oil sources are maintained at generally equal pressures, the pressure drop along the path of the air side oil is significantly greater than the pressure drop experienced by the hydrogen side oil. Therefore, these conditions result in an air side oil flow which is significantly greater than the hydrogen side oil flow. By passing the air side oil flow over the second gland seal ring 102, the present invention takes advantage of this higher rate of flow to cool the second gland seal ring 102.

The first gland seal ring 100 can also be provided with a means for introducing the air side oil between it and the axially outer face of the annular groove 104. In FIG. 3, this function is performed by a groove 140 in the axially outer surface of the first gland seal ring 100 which, in conjunction with an axial hole 142, permits a slight flow of air side oil to enter the space between the first gland seal ring 100 and the outer axial face of the annular groove 104. This groove 140 permits oil pressure to be introduced between the axially outer face of the annular groove 104 and the first gland seal ring 100 which results in an axially inward force against the first gland seal ring 100. This axially inward force partially counterbalances any axially outward forces, caused by the hydrogen and oil pressures, which would otherwise tend to force the first gland seal ring 100 against the wall of the annular groove with sufficient force to cause the first gland seal ring 100 to bind and, therefore, lose some of its radial freedom of movement.

In FIGS. 1, 2 and 3, the hydrogen side HS and air side AS are clearly illustrated. The axially inboard hydrogen side HS of the gland seal bracket is maintained at a significantly higher gas pressure than the axially outboard air side AS which is at atmospheric pressure. In typical applications of a gland seal bracket made in accordance with the present invention, the hydrogen side HS is maintained at a pressure from 45 to 75 psig. The incoming oil supply is maintained at a pressure of approximately 12 psi above the hydrogen side HS pressure.

In applications in which the hydrogen side HS pressure is 75 psig, the incoming oil is therefore supplied at a pressure of approximately 87 psig. Therefore, it should be apparent that the hydrogen side oil, illustrated by arrows H in FIG. 3, experiences only a 12 psi pressure differential along its path whereas the air side oil, illustrated by arrows A experiences an 87 psi pressure differential along its path. These significantly different pressure drops account for the higher flow rate of air side oil. It should therefore be apparent that the flow of air side oil over the radially outer portions of the second gland seal ring 102 takes advantage of these flow differentials to permit additional heat removal from the second gland seal ring 102.

By comparing FIGS. 1 and 3, some additional advantages of the present invention can also be seen. In FIG. 3, the gap between the second gland seal ring 102 and the bracket 106 is essentially eliminated by the axially inward force exerted on the second gland seal ring 102 by the air side oil flow as it passes between the first and second gland seal rings. By comparing this characteristic to the assembly shown in FIG. 1, it can be seen that the non-functional radial oil flow which passes from the annular groove 24 in FIG. 1 into the hydrogen atmosphere at the hydrogen side HS of the gland seal is eliminated. By thus causing the second gland seal ring 102 to move axially inward against the bracket 106, this gap is essentially eliminated.

A related advantage of the present invention, as can be seen by comparing FIG. 1 and FIG. 3, is the reduced radial dimension of the annular groove 110 as shown in FIG. 3. This reduced radial dimension is made possible by the fact that the axial hole 112 extends directly in an axial direction from the annular groove 110 into the annular groove 114. In FIG. 1, the annular groove 24 must have a sufficient radial dimension to permit complete fluid communication between it and the hole 26 which, as shown, extends at an angle which is not truly axial. By reducing the radial dimension of the annular groove 110, as illustrated in FIG. 3, the radial dimension of the land portion which exists between the annular groove 110 and the radially inner surface of the bracket 106 is correspondingly lengthened and oil flow between the bracket 106 and the second gland seal ring 102 is further reduced.

Another feature of the present invention can be seen by comparing FIGS. 1 and 3 and noting the absence of any required means for passing a flow of float oil through the bracket 106. In FIG. 1, this means comprises the hole 40 and the annular groove 42 in order to conduct a flow of float oil, as indicated by arrows F, against the axially outward surface of the gland seal ring 16. In FIG. 3, the present invention is shown as having no similar passage through its brackets 106. Instead, this function is accomplished by the annular groove 140 which is formed in the axially outer surface of the first gland seal ring 100.

In FIGS. 1, 2 and 3 all of the gland seal rings are illustrated as having a wear surface on their inner cylindrical surfaces. These wear surfaces are referenced with numeral 21. Generally, this material would be a coating of a soft metallic alloy such as babbitt.

FIG. 4 illustrates a butt joint which is commonly used to join the two halves of a gland seal ring. The two halves of the gland seal ring, 200 and 202, are joined at a mating surface 204 with a bolt 206 extending through both halves of the gland seal ring in a direction which is generally perpendicular to the mating surface 204. Also shown in FIG. 4 is an anti-rotation pin 208 which extends radially from the gland seal ring and is used to prevent the gland seal ring from rotating around its associated shaft. As can be seen in FIG. 4, if the mating surfaces of the two halves, 200 and 202, of the gland seal ring are not precisely machined (i.e., not perfectly radial), the bolt 206 will exert a tangential force on these two halves which will attempt to pull them together along the mating surface 204. This force can distort the rings and cause them to assume a shape which is out-of-round. If this occurs, the problems of rubbing which are described above can be severely exacerbated. The babbitted surfaces 210 of the halves of the gland seal ring, 200 and 202, are shown in FIG. 4 as they would appear in an axial view of the gland seal ring assembly.

FIG. 5 illustrates the lap-type joint of a gland seal ring made in accordance with the present invention. The two halves of the gland seal ring, 220 and 222, are shown being joined at a mating surface 224. An antirotation device 228 is shown disposed in an annular groove in the radially outer surface of the gland seal ring. Comparing FIGS. 3 and 5, the groove illustrated in FIG. 5 can be seen in both the first 100 and second 102 gland seal rings illustrated in FIG. 3. The particular ring illustrated in FIG. 5 is representative of the second gland seal ring (reference numeral 102 in FIG. 3). The anti-rotation member 228, which is also used to fasten the two halves together, is inserted into the groove and attached to both halves of the gland seal ring, 220 and 222, with shoulder bolts 230 as shown. The antirotation device 228 is also shaped in such a way that it prevents circumferential movement of the barrier 122 which is also illustrated in FIG. 3. As illustrated in FIG. 5, the anti-rotation device 228 provides a means for fastening the two halves of the gland seal ring of the present invention together in such a way that no tangential force is exerted on them. Therefore, if the mating surfaces of these two halves are not precisely machined (i.e., not perfectly radial), the present invention will exert no tangential force to draw the two halves together at this mating surface, and, therefore, will introduce no additional distortion in the gland seal ring.

It should be apparent that the present invention provides a gland seal assembly which incorporates a double oil flow in conjunction with two gland seal rings in such a way that non-functional oil leakage is minimized. Furthermore, the present invention reduces the importance of extremely precise machining of the annular groove in which the gland seal rings are disposed. This beneficial effect is achieved by passing a radial flow of oil between the two rings. This flow of oil between the rings exerts a pressure force in opposing axial directions on the two rings and forces them apart in such a way that gaps between the rings and the bracket are reduced. Furthermore, the present invention provides an additional cooling effect, as discussed above, on the inboard gland seal ring by passing the air side oil flow over it. Although the present invention has been illustrated and described in considerable detail, it should not be considered to be so limited. It should be further understood that alternative embodiments of gland seal assemblies can be made in accordance with the present invention.

I claim:

1. A seal for a rotating shaft, comprising:
a first ring having a first inner cylindrical surface;
a second ring having a second inner cylindrical surface, said second inner cylindrical surface having an opening therethrough, said first and second rings being shaped to fit around said rotating shaft with a clearance between said shaft and said first and second inner cylindrical surfaces, said first and second inner cylindrical surfaces being disposed in coaxial association with each other;
first means for conducting a first fluid through said second ring, said first fluid conducting means being in fluid communication with said opening through said second inner cylindrical surface;
second means for conducting a second fluid in a radially inward direction between said first and second rings;
a bracket having a third cylindrical inner surface, said third cylindrical inner surface having an annular groove therein, said annular groove being shaped to receive said first and second rings, said annular groove being shaped to permit said first and second rings to move radially within said annular groove;
third means for conducting said second fluid from an external source into said annular groove, said third fluid conducting means being in fluid communication with said second fluid conducting means; and
fourth means for conducting said first fluid from an external source into said annular groove, said fourth fluid conducting means being in fluid communication with said first fluid conducting means.

2. The seal of claim 1, further comprising:
a soft metallic alloy disposed on said first and second inner cylindrical surfaces.

3. The seal of claim 2, wherein:
said soft metallic alloy is babbitt.

4. The seal of claim 1, wherein:
said second fluid conducting means comprises a raised protion on an axial surface of said first ring, said raised portion being disposed proximate an axial surface of said second ring, said raised portion having at least one radial fluid passage in fluid communication with said third fluid conducting means.

5. The seal of claim 1, further comprising:
means for maintaining the pressure of said first fluid generally equal to the pressure of said second fluid.

6. The seal of claim 1, wherein:
said opening through said second inner cylindrical surface is an annular groove.

7. The seal of claim 1, further comprising:
fifth means for conducting said second fluid between said first ring and said bracket, said fifth fluid conducting means being in fluid communication with said second fluid conducting means.

8. The seal of claim 1, wherein:
said first and second rings are made of brass.

9. The seal of claim 1, further comprising:
a rotatable shaft disposed in sliding relationship with said first and second rings, said rotatable shaft being coaxial with said first and second inner cylindrical surfaces.

10. The seal of claim 9, wherein:
said rotatable shaft is a rotor of a dynamoelectric machine.

11. A dynamoelectric machine, comprising:
a stator structure;
a bracket having a generally cylindrical opening therethrough, said opening having a generally cylindrical inner surface, said bracket being attached to said stator structure, said generally cylindrical inner surface having an annular channel therein;
a first ring shaped to fit within said annular channel;
a second ring shaped to fit within said annular chamber;
first means for conducting a first fluid into said annular channel from a first fluid source;
second means for conducting said first fluid through said second ring and out of said ring in a radially inward direction, said first and second fluid conducting means being in fluid communication with each other;
third means for conducting a second fluid into said annular chamber from a second fluid source;
fourth means for conducting said second fluid between said first and second rings in a radially inward direction, said third and fourth fluid conducting means being in fluid communication with each other; and
said first and second rings being disposed within said annular channel in such a way as to have freedom of movement in the radial direction.

12. The machine of claim 11, wherein:
said fourth fluid conducting means comprises a means for spacing said first and second rings axially apart from each other.

13. The maching of claim 12, wherein:
said spacing means is a boss on an axial surface of said first ring, said boss having a radial groove therethrough, said radial groove being shaped to permit the passage of said second fluid therethrough.

14. The machine of claim 11, further comprising:
an annular groove in the inner cylindrical surface of said second ring being in fluid communication with said second fluid conducting means.

15. The machine of claim 11, further comprising:
an annular groove in an axial surface of said first ring being in fluid communication with said third fluid conducting means and facing an axial wall of said annular channel.

16. The machine of claim 11, further comprising:
means for equalizing the pressures of said first and second fluids within said bracket.

17. The machine of claim 11, further comprising:
a soft metallic alloy disposed on the inner cylindrical surfaces of said first and second rings.

18. The machine of claim 17, wherein:
said soft metallic alloy is babbitt.

19. The machine of claim 11, wherein:
said first and second rings are made of brass.

20. The machine of claim 11, further comprising:
a rotor disposed within said stator structure, said rotor being coaxial with said first and second rings.

* * * * *